April 4, 1950     KURT POSNER     2,503,171
NOW BY CHANGE OF NAME
JOHN KENNEDY POWER
METHOD AND APPARATUS FOR MANUFACTURING CONTAINERS
Filed Oct. 31, 1945     9 Sheets-Sheet 1
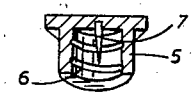
FIG. 1.
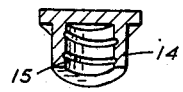
FIG. 2.
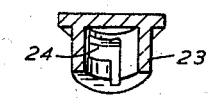
FIG. 3.
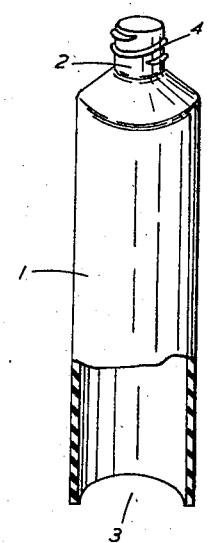
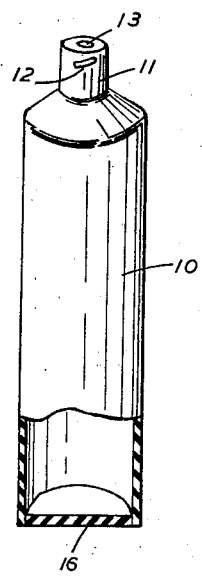
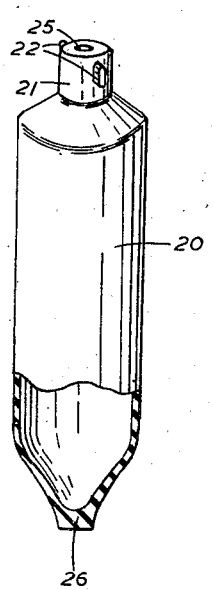
INVENTOR
KURT POSNER
NOW BY CHANGE OF NAME JOHN KENNEDY POWER
By
his Attorney April 4, 1950

KURT POSNER
NOW BY CHANGE OF NAME
JOHN KENNEDY POWER
METHOD AND APPARATUS FOR MANUFACTURING CONTAINERS

Filed Oct. 31, 1945

INVENTOR
KURT POSNER
NOW BY CHANGE OF NAME JOHN KENNEDY POWER
By
his Attorney

April 4, 1950 KURT POSNER 2,503,171
NOW BY CHANGE OF NAME
JOHN KENNEDY POWER
METHOD AND APPARATUS FOR MANUFACTURING CONTAINERS
Filed Oct. 31, 1945 9 Sheets-Sheet 3

INVENTOR
KURT POSNER
NOW BY CHANGE OF NAME JOHN KENNEDY POWER
By
his Attorney

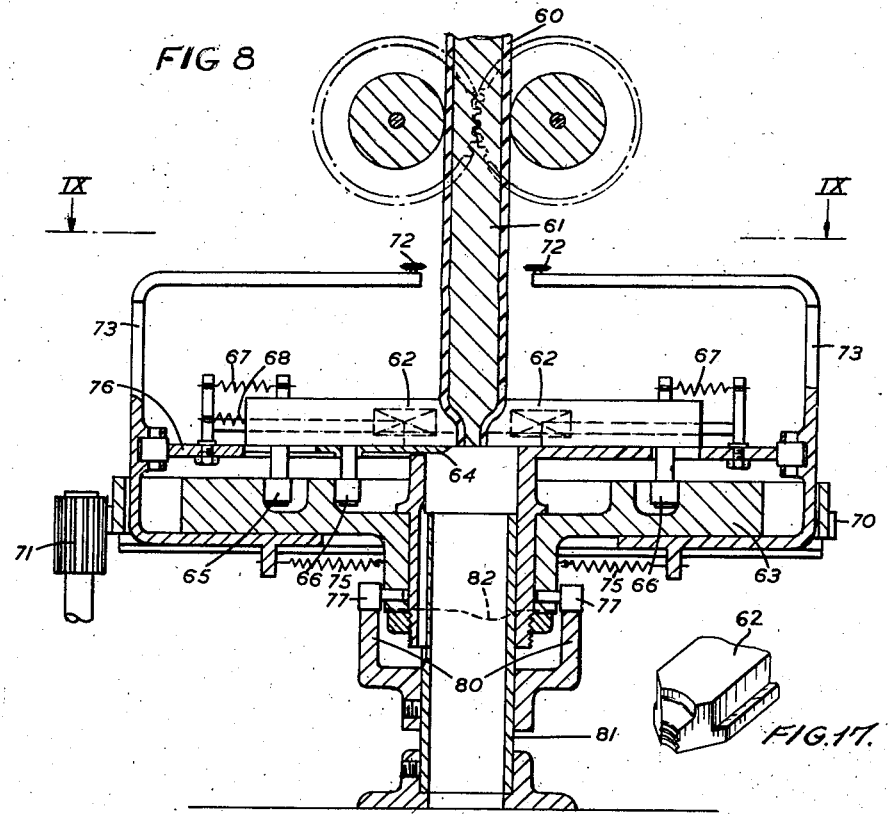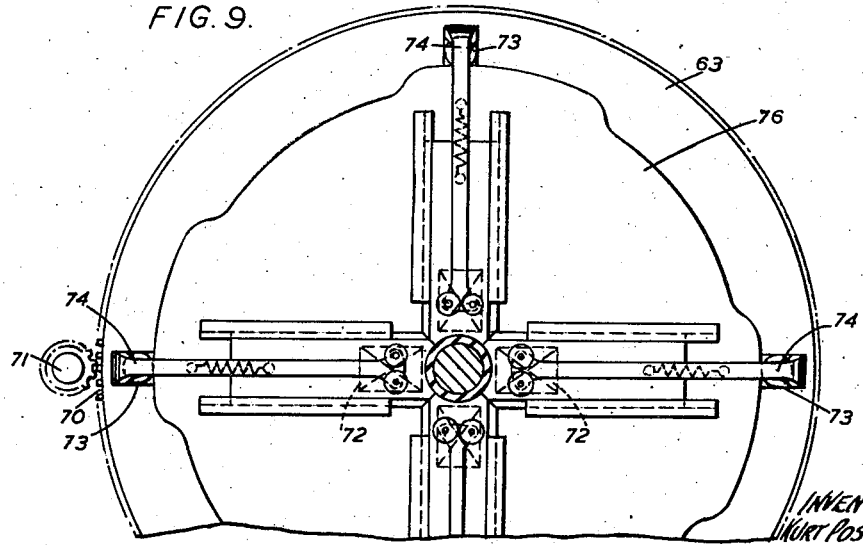

April 4, 1950

KURT POSNER
NOW BY CHANGE OF NAME
JOHN KENNEDY POWER
METHOD AND APPARATUS FOR MANUFACTURING CONTAINERS

Filed Oct. 31, 1945

INVENTOR
KURT POSNER
NOW BY CHANGE OF NAME JOHN KENNEDY POWER
By
his Attorney

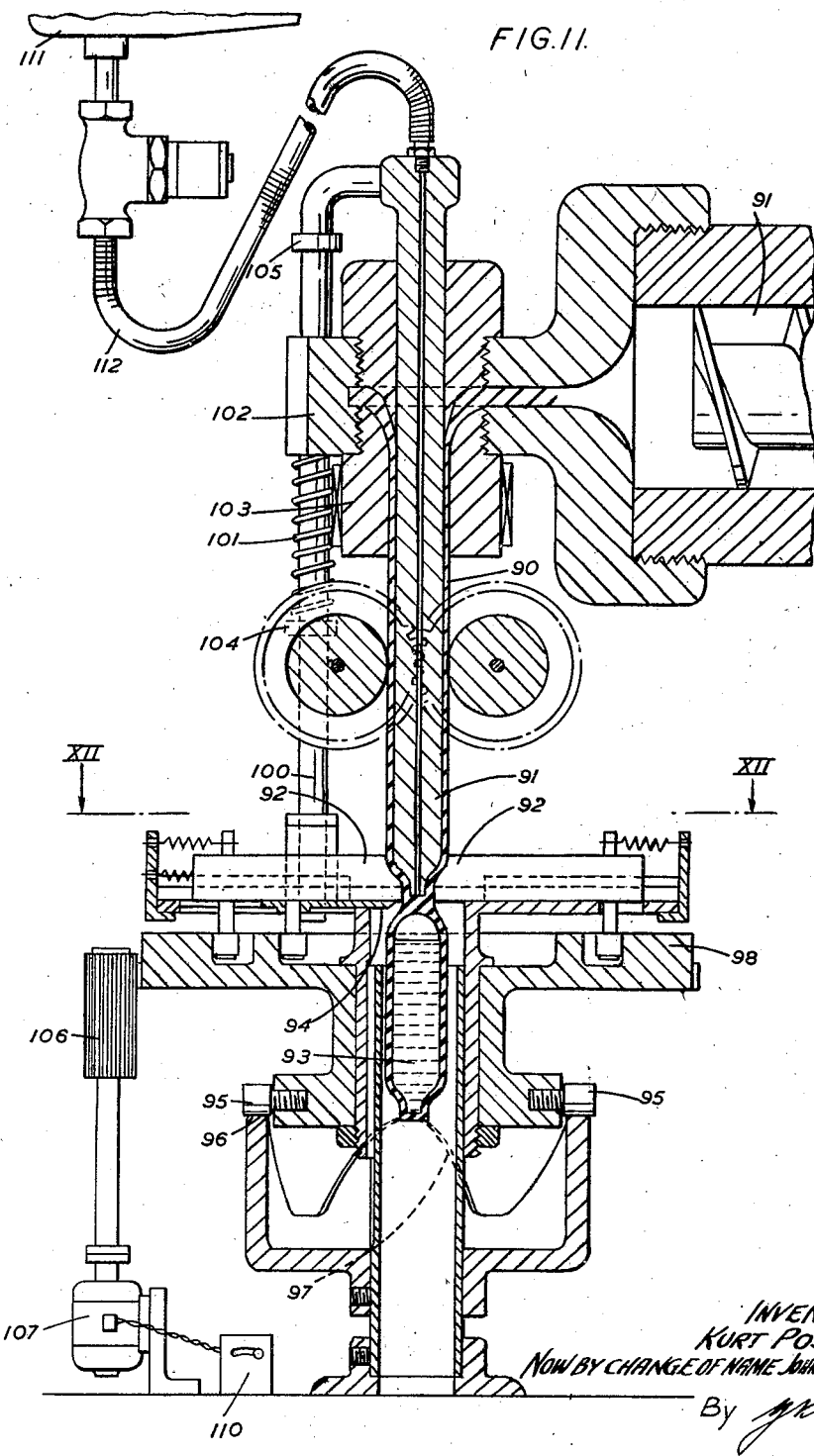

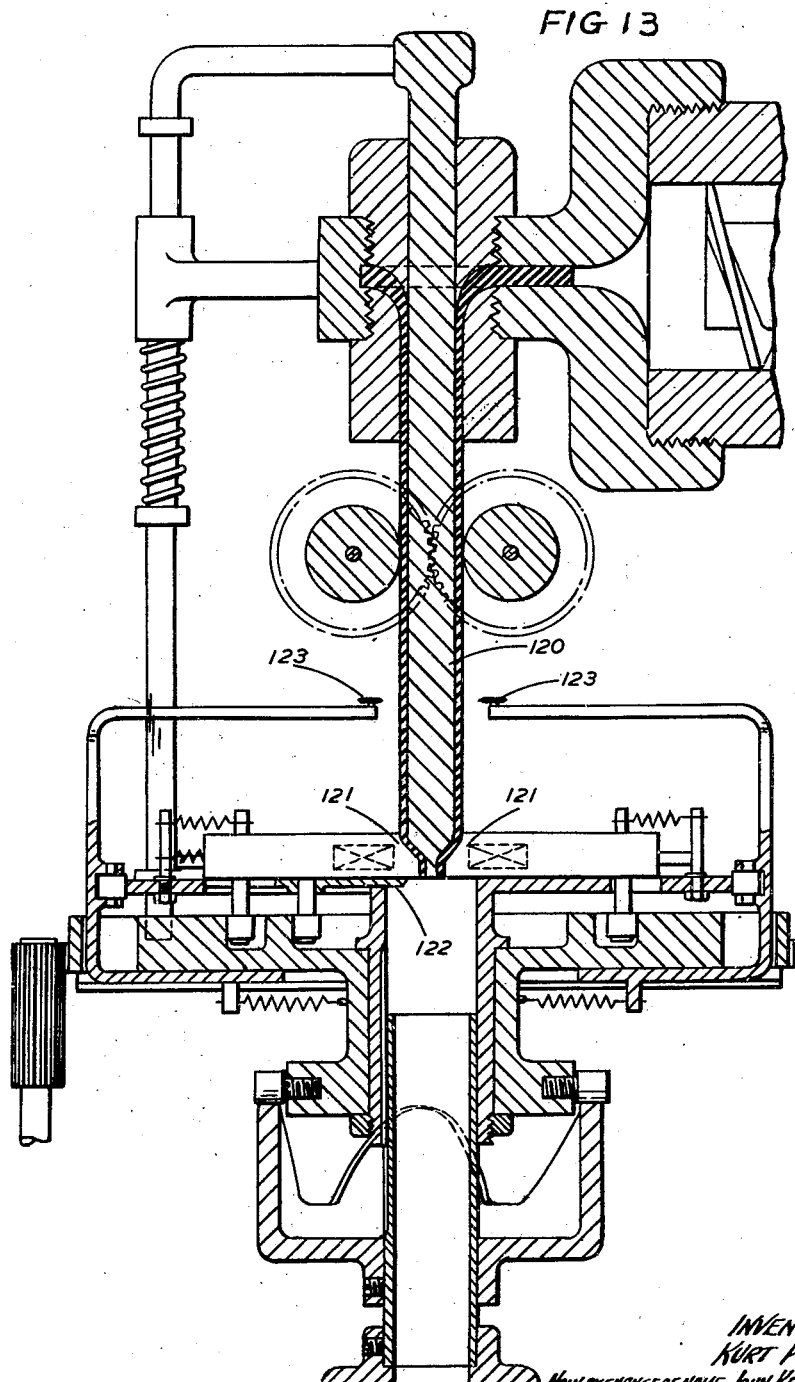

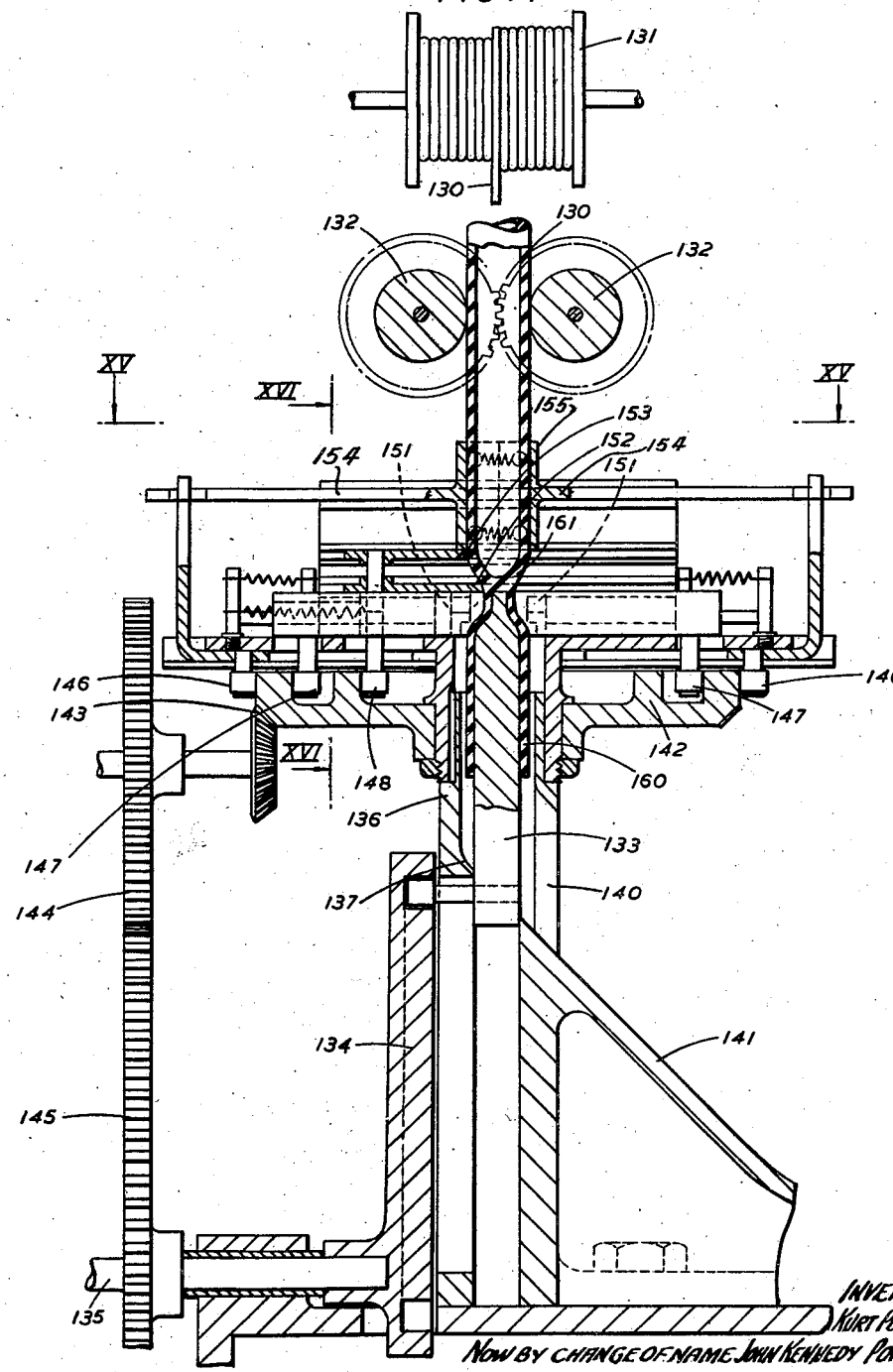

Patented Apr. 4, 1950

2,503,171

UNITED STATES PATENT OFFICE 2,503,171

METHOD AND APPARATUS FOR MANUFACTURING CONTAINERS

Kurt Posner, London, England, now by change of name John Kennedy Power

Application October 31, 1945, Serial No. 625,768
In Great Britain November 13, 1944

14 Claims. (Cl. 18—5)

The present invention relates to a method of, and means for, manufacturing containers, such as capsules and collapsible tubes, made of plastic material, for example gelatine, cellulose derivatives such as esters or ethers, polymerization products or the like.

It is the main object of the invention to provide simple method and means for manufacturing such containers having each an elongated neck portion provided with means, such as external screw threads, for attaching a cap or similar closure member to the neck portion and retaining it thereon.

Subsidiary objects of the invention are to provide simple method and means:

For manufacturing containers of the kind just described in which the neck portion of each container has an opening through which the container may be emptied, the cap or similar closure member serving to close the opening;

For manufacturing containers in which the neck portion of each container is originally completely closed and is adapted to be subsequently opened by piercing or cutting it before the container is emptied or partly emptied, the cap or similar closure member serving to close the opening;

For manufacturing and simultaneously filling the containers with a liquid, paste or powder, or an article or articles;

For manufacturing the containers by continuously or intermittently extruding the plastic material through an extrusion nozzle;

For manufacturing the containers from a premanufactured tubing;

For manufacturing collapsible tubes which are open at the end remote from the neck portion so that they may subsequently be filled through the open end;

For manufacturing filled tubular capsules which are closed at the end remote from the neck portion.

Other objects and advantages of the present invention will become apparent to those skilled in the art from the following specification when read in connection with the accompanying drawings, in which:

Fig. 1 illustrates a collapsible tube which is originally closed at its neck portion and open at its end remote from the neck portion;

Fig. 2 illustrates a slightly modified collapsible tube which has an opening at its neck portion and has been closed at its end remote from the neck portion;

Fig. 3 illustrates a capsule filled with a liquid, the capsule having an opening at its neck portion;

Fig. 8 is a sectional view similar to Fig. 5 of a modification of the apparatus shown in Figs. 4 to 7 for manufacturing collapsible tubes each having an opening at the neck portion and being open at the end remote from the neck portion;

Fig. 9 is a section along the line IX—IX of Fig. 8;

Fig. 11 is an enlarged section through part of the apparatus shown in Fig. 10;

Fig. 13 is a sectional view similar to Fig. 11 of a modification of the apparatus shown in Figs. 10 to 12 for manufacturing collapsible tubes each having an opening at the neck portion and being open at the end remote from the neck portion;

Fig. 14 is a sectional view through a third apparatus according to the invention in which the containers are made from a premanufactured tubing;

Fig. 17 is a perspective view of a detail of the embodiments described.

In all the figures, the same reference numerals indicate the same parts.

Figure 4:
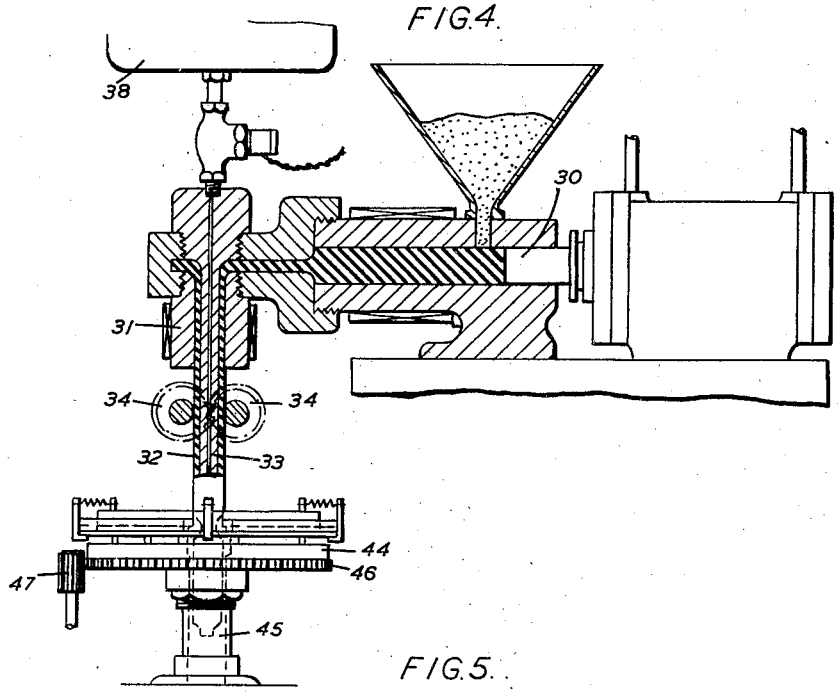
Fig. 4 is a general view, partly in section, of an apparatus according to the invention for manufacturing and filling capsules each having an opening at the neck portion and being closed at the end remote from the neck portion.

The present invention may be considered as an improvement, or modification of my invention disclosed in my co-pending patent application Serial No. 603,542 of July 6, 1945.

From the broadest aspect of my present invention, an elongated neck portion is formed on a container made of plastic material by heating the plastic material and squeezing it against a tapered end portion of a mandrel by means of a squeezing device which also embosses screw threads or the like means on the outer surface of the neck portion for attaching the cap to the neck portion and retaining it thereon.

Referring now to the accompanying drawings, Figs. 1, 2, and 3 illustrate, by way of example, three different kinds of containers which it is intended to manufacture by the method and means according to this invention. Fig. 1 illustrates a collapsible tube 1 having a completely closed neck portion 2 and being open at its end 3 remote from the neck portion. The tube 1 may be filled through its open end 3 with a liquid, paste, powder or similar material or articles and the open end 3 may subsequently be closed in any known and convenient manner. On the outer surface of the neck portion 2 screw threads 4 are provided for attaching and retaining a cap 5 provided with internal complementary screw threads 6. In the cap 5, a pin or needle 7 is provided which pierces the top of the neck portion 2 when the cap 5 is attached thereto for the first time, the attached cap preventing the contents of the tube from leaking out through the opening.

Fig. 2 illustrates a collapsible tube 10 having a neck portion 11 provided at its outer surface with only a part 12 of a screw thread, a similar, second, part of the screw thread not visible being provided at the opposite side of the neck portion 11. The neck portion 11 has an opening 13 which may be closed by a cap 14 having internal screw threads 15 adapted to engage the parts 12 and thereby to retain the cap 15 on the neck portion 11. The tube 10 was originally open at its end remote from the neck portion 11.

After the tube has been filled through its open end, the open end is closed by a bottom member 16.

Fig. 3 illustrates a capsule 20 having a neck portion 21 provided with studs 22 or the like enabling retaining a cap 23 on the neck portion 21 by means of an internal bayonet catch 24 in the cap 23. The neck portion 21 has an opening 25 through which the capsule may be emptied when the cap 23 has been removed from the neck portion 21, the end 26 of the capsule 20 being closed, and the capsule 20 filled while manufactured as will be described hereinafter.

Figs. 4, 5, 6 and 7 illustrate a first embodiment of an apparatus according to the invention in which a tube of plastic material is intermittently extruded, while a capsule similar to that illustrated in Fig. 3 is being manufactured and filled, for example, with a liquid such as liquid fuel for cigarette lighters. The intermittently acting extrusion mechanism comprises a hydraulically operated reciprocating piston 30 for intermittently extruding a predetermined length of a tube 32 at each stroke of the piston 30. Since such extruding mechanisms are well known in the art, it is believed that a detailed description thereof is not necessary. The plastic material is extruded through an electrically heated extrusion nozzle 31 to form the tube 32 around a hollow mandrel 33, the tube being fed downwards by guide rollers 34, the interior of the hollow mandrel 33 communicating with a tank 38 for storing the material to be filled into the containers. The guide rollers 34 serve to impel the tube 32 to move in a downward direction; the hollow mandrel 33 serves to discharge material stored in the tank 38 from said tank into the tube 32. The lower end of the hollow mandrel 33 is tapered so that its shape corresponds to the interior of the neck portions of the capsules to be manufactured. The tapered lower end of the hollow mandrel 33 is surrounded by four jaws 35 which are movably mounted in brackets 36, so that they can move in a horizontal plane towards and away from the lower end of the mandrel 33 in a manner to be described further below. Each end surface of the jaws 35 corresponds to a quarter of the outer surfaces of the neck portions of the capsules to be manufactured, that is to say the said end surfaces when in the position nearest to the lower end of the mandrel 33 form a somewhat annular space between themselves and the mandrel corresponding in thickness and shape to the neck portion, the said end surfaces being suitably engraved so as to be able to emboss, on the outer surface of a neck portion, the retaining means 22 for the cap 23. Each jaw 35 is adapted to be heated by an electric heater 37, and is provided with a shaft 40 carrying a roller 41. By means of springs 42, the jaws 35 are urged away from the mandrel 33 whereby the rollers 41 are caused to bear against a cam surface 43 (see Fig. 7) provided in a turn-table 44 rotatably mounted on a hollow stand 45. At its circumference, the turn-table 44 is provided with teeth 46 meshing with a gear wheel 47 driven from any suitable drive (not shown). Beneath the jaws 35, a cutter 50 is arranged carrying a shaft 51 and a roller 52 urged, by means of a spring 53, against a second cam surface 54 in the turn-table 44. The turn-table 44 rests on a stationary surface 58 of the hollow stand 45.

Figure 5:
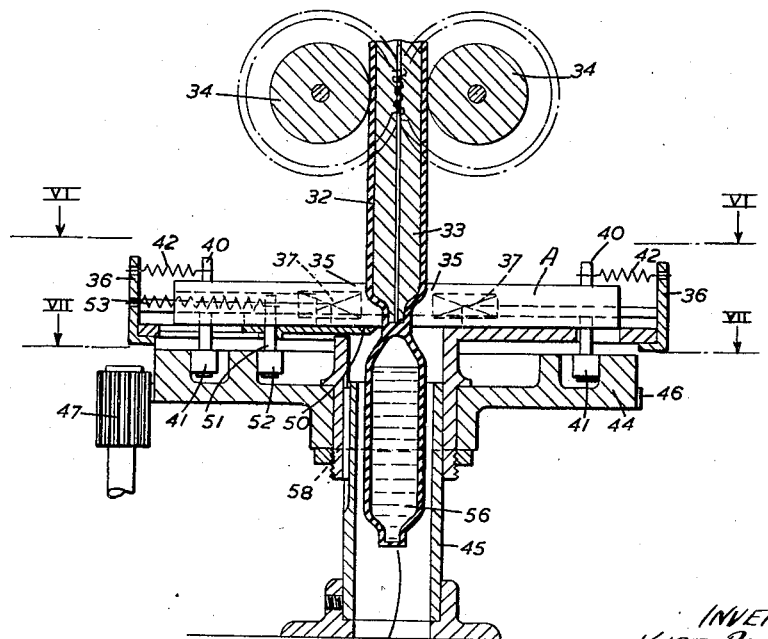
Fig. 5 is a sectional view, on an enlarged scale, of a part of the apparatus shown in Fig. 4.
Figure 6:
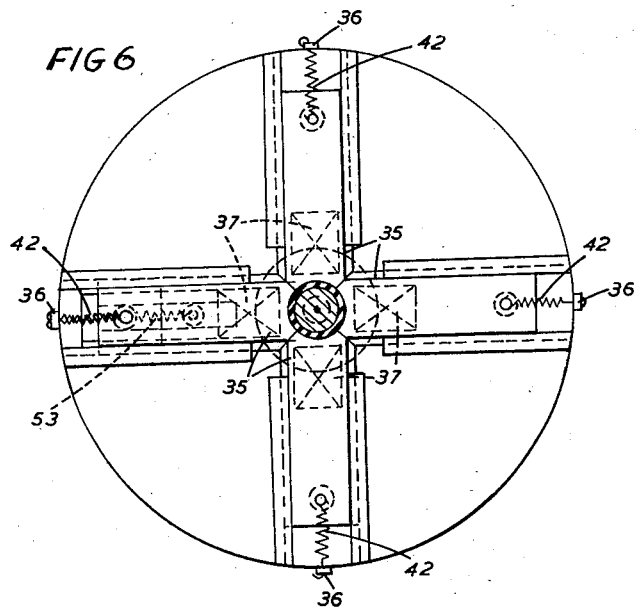
Figs. 6 and 7 are sections along the lines VI—VI and VII—VII respectively of Fig. 5.
Figure 7:
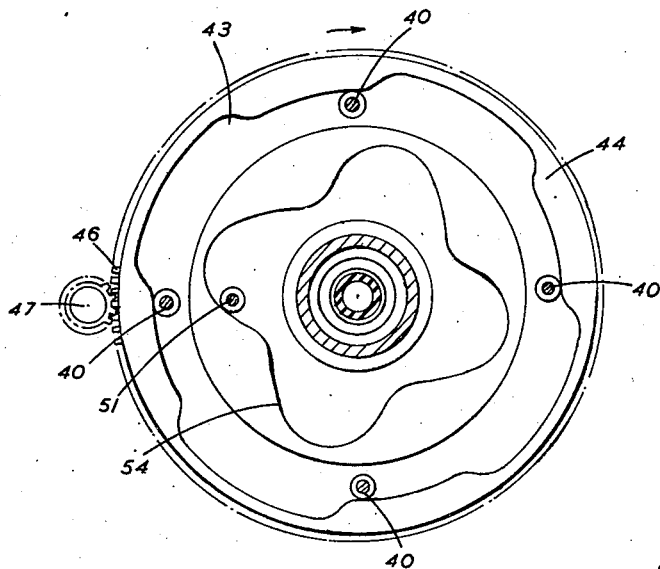

In operation, a tube 32 of plastic material is intermittently extruded by the extruding mechanism 30 through the extrusion nozzle 31 around the hollow mandrel 33. In timed relationships to the extruding mechanism, the turn-table 44 is continuously rotated by the gear wheel 47 in the direction of the arrow shown in Fig. 7. Starting from the position illustrated in Figs. 5 and 7 in which the jaws 35 have just closed around the mandrel, and the extrusion has been interrupted so that the tube 32 remains stationary, the cutter 50 is, on further rotation of the turn-table 44, moved towards the right under the action of the cam surface 54 on the roller 51 and severs the finished and filled capsule 56 from the tube 32, leaving the tapered end of the tube 32 closed. The capsule 56 drops down through the hollow stand 45 into a basket or similar collecting means (not shown). On further rotation of the turn-table 44, the cutter 50 and the jaws 35 are retracted so that they leave a free passage for the tube 32. The extrusion mechanism 30 now performs one stroke, whereby a further length of the tube 32 is extruded and the lower, closed, end of the tube 32 reaches the position indicated in Fig. 5 by A. When the extrusion mechanism has completed its stroke the tube 32 comes, again, to rest. A predetermined quantity of filling material is fed from the tank 38 through the hollow mandrel 33 into the tube 32, the ejected material resting on the closed lower end of the tube 32. On further rotation of the turn-table 44, the heated jaws 35 closed around the lower end of the mandrel 33, heat and thereby soften the part of the tube enclosed between the jaws and the lower end of the mandrel, squeeze the entrapped plastic material together to close the tube 32 as shown in Fig. 5. Simultaneously, the retaining means are embossed on the tube 32 by the jaws, whereupon the cycle of operations just described is repeated, that is to say, a finished and filled capsule is severed from the tube, the jaws are opened, another length of tube is extruded, and so on. It will be seen, particularly from Fig. 7, that four cycles of operation are performed while the turn-table 44 performs one revolution.

Figs. 8 and 9, which will now be described, illustrate a modification of the apparatus shown in Figs. 4, 5, 6 and 7. While by the previously described apparatus capsules are manufactured, which are filled while being made and closed at both ends, with the apparatus illustrated in Figs. 8 and 9 collapsible tubes are manufactured, which are not filled during their manufacture and are open at both ends. The neck portion of each manufactured collapsible tube is provided with retaining means for a cap and the other end may subsequently be closed in any convenient manner, for example by attaching a bottom to the collapsible tube after it has been filled. A tube 60 (Fig. 8) is intermittently extruded around a mandrel 61, by an extruding mechanism not shown but similar to that illustrated in Fig. 4. The mandrel 61 need not be hollow since no filling material or articles have to be fed therethrough, and is illustrated as solid. It is tapered at its lower end and surrounded by four movable jaws 62 (only two being visible in Fig. 8), which are heated electrically and are similar to the jaws 35 of the previously described embodiment except that they are so arranged that the lower horizontal surfaces of the jaws 62 lie substantially in the same plane as the lower tip of the mandrel 61, while in the previously described arrangement the tip of the mandrel 33 is somewhat higher than the plane of the lower horizontal surfaces of the jaws 35. The jaws 62 and a cutter 64, similar to the cutter 50 previously described, are actuated over rollers 65, 66 by a turn-table 63 provided with two cam surfaces adapted to rotate bodily with the turn-table 63 and similar to the cam surfaces 43 and 54 previously described, against which the rollers 65, 66 bear under the action of springs 67 and 68. The turn-table 63 is provided with circumferential teeth 70 meshing with a gear wheel 71 which may be driven by any suitable drive (not shown). So far the arrangement of the turn-table, the jaws and the cutter is similar to the corresponding arrangement previously described. In addition, there are provided eight cutting wheels 72 supported in pairs on four brackets 73 which are attached to, and bodily rotatable with, the turn-table 63. Each bracket 73 is provided with a roller 74 bearing, under the action of springs 75, against a stationary cam surface 76. The turn-table 63 is supported by rollers 77 on a stationary cam surface 80 attached to a hollow stand 81, having dips one of which is indicated at 82.

In operation, a tube 60 of plastic material is intermittently extruded around the mandrel 61. In timed relationship to the extruding mechanism, the turn-table 63 is continuously rotated. In the position shown in Fig. 8, the jaws 62 have just closed around the mandrel 61, thereby heating and softening the lower end of the tube 60 and shaping the neck portion around the mandrel 61 and embossing the retaining means for the cap on the outer surface of the neck portion. Since the lower horizontal surfaces of the jaws and the lower tip of the mandrel 61 lie in the same plane, the plastic tube 60 cannot be completely squeezed together, but remains open at its lower end as clearly shown in Fig. 8. On further rotation of the turn-table, the cutter 64 is actuated which merely acts as a trimming knife to smooth the lower free edge of the tube. Simultaneously, the eight cutting wheels 72 close in on the mandrel 61 and, as they are rotating with the turn-table 70, cut the tube 60 completely. On further rotation of the turn-table, the cutter 64 is retracted and the jaws 62 are opened while the cutting wheels 72 remain closed in. While they are still in such position, the rollers 77 supporting the turn-table 63 on the cam surface 80 reach the dips 82, whereby the turn-table 63 and cutting wheels 72 attached thereto are lowered. The cutting wheels push the lower cut-off part of the tube 60 downwards so that it is ejected from the mandrel 61 and falls through the hollow stand 81 into a collecting device (not shown). On further rotation of the turn-table 63, the cutting wheels 72 are retracted from the mandrel 61, and the turn-table is raised. Another length of the tube 60 is extruded, and subsequently the jaws 62 close in on the mandrel 61, so that the position illustrated in Fig. 8 is reached, whereupon the apparatus is ready for the next cycle of operation.

Figure 10:
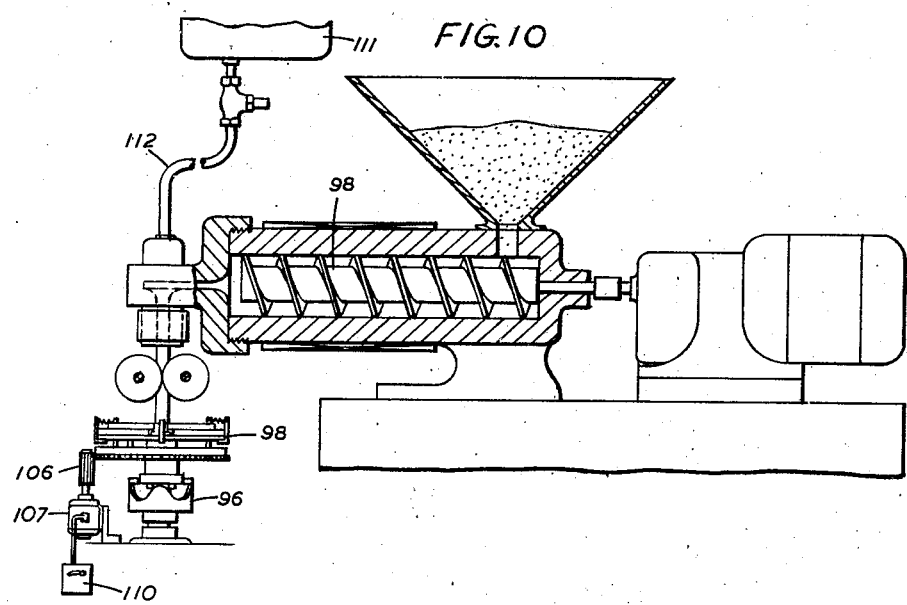
Fig. 10 is a general view, partly in section, of another apparatus according to the invention for manufacturing filled capsules closed at both ends.
Figure 12:
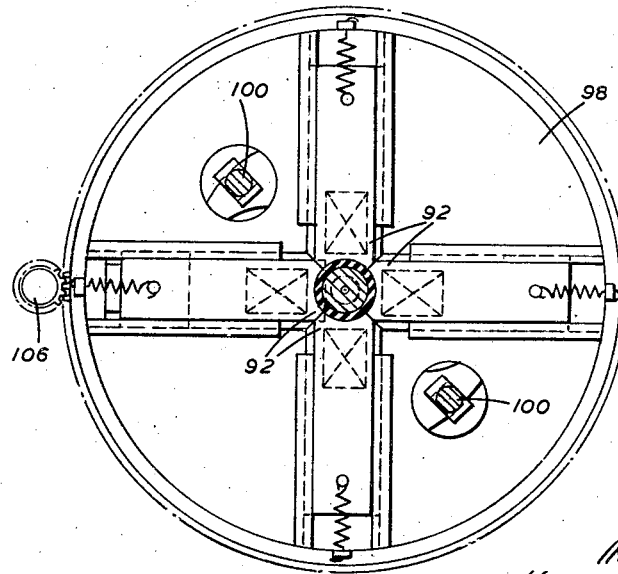
Fig. 12 is a section along the lines XII—XII of Fig. 11.

While with the apparatus so far described the tube of plastic material is extruded intermittently, Figs. 10, 11 and 12 illustrate an apparatus in which a tube 90 is extruded continuously around a hollow mandrel 91 by an extruding mechanism 98 which in construction and operation is well known in the art and therefore believed to need no further explanation. Again, filling material is introduced into the tube 90, a neck portion formed and closed by four heatable jaws 92, and a finished and filled capsule 93 severed from the tube 90 by a cutter 94, the jaws 92 and the cutter 94 being mounted on a turn-table 98 in the manner described hereinbefore with reference to Figs. 4, 5, 6 and 7. Since, however, the tube 90 is extruded continuously, it is necessary for the jaws 92 and the cutter 94 to follow the downwards moving tube 90 while in contact therewith. To achieve this, the turn-table 98 is supported by means of rollers 95 on a cam surface 96 having dips, one of which is indicated at 97. The dips 97 are deeper than the corresponding dips 58 and 82 indicated in Figs. 5 and 8 whereby to enable the turn-table to be lowered to a greater extent than with the previous arrangements. The mandrel 91 is supported by two brackets 100 only one of which is visible in Fig. 11 and which are pressed against the turn-table by means of springs 101 bearing against the mount 102 for the extrusion nozzle 103 and collars 104 rigidly attached to the brackets 100. Additional collars 105 are rigidly attached to the brackets 100 which limit the downward movement of the brackets, and thereby of the mandrel 91, when the collars 105 abut against the upper surface of the mount 102. In order not to impede movement of the mandrel, the interior of the mandrel 91 communicates with a tank 111 by means of a flexible hose 112 or the like. The turn-table 98 is driven over a gear wheel 106 by an electric motor 107 the speed of which may be adjusted by a rheostat 110 to be suited to the speed with which the tube 90 is continuously extruded.

Starting from the position illustrated in Fig. 11, the jaws 92 are closed around the tube 90, have heated, softened and squeezed together the tube 90 at the lower end of the mandrel 91, and formed a closed neck portion with the attaching means thereon for a cap. On rotation of the turn-table 98, the turn-table together with the jaws 92, the cutter 94 and the mandrel 91 held by the brackets 100 are lowered. Simultaneously, the cutter 94 is actuated in the manner described hereinbefore and a finished and filled capsule 93 is severed from the tube 90 and falls down through the hollow stand. On further rotation of the turn-table 98, the turn-table with the devices associated therewith are lowered until the collar 105 abuts against the mount 102 and comes to rest. On further rotation of the turn-table 98, the turn-table, the cutter 94, and the jaws 92 are further lowered, while the mandrel 91 remains stationary. The jaws, which still clamp the lower end of the tube 90 together, draw the lower end of the tube downwards, so that it becomes clear of the mandrel similarly as is the case with the arrangements of Figs. 4, 5, 6, 7; and Figs. 8 and 9. On still further rotation of the turn-table 98, the cutter 94 and the jaws 92 are retracted, the turn-table 98 is raised, together with the cutter 94 and the jaws 92, the mandrel 91 is raised against the action of the spring 101 when the lower ends of the brackets 100 contact the turntable, and the tube 90 is filled through the hollow mandrel 91 with filling material or an article or articles from the tank 111, through the hose 112 and the hollow mandrel 91. When the turn-table 98 has reached its uppermost position, the jaws 92 close again around the mandrel, thus reaching the position illustrated in Fig. 11, whereupon the apparatus is ready for the next cycle of operation. Fig. 13 shows a modification of the arrangement shown in Figs. 10, 11 and 12. While with the arrangement according to Figs. 10, 11 and 12 filled capsules closed at both ends are manufactured from a continuously extruded tube of plastic material, with the apparatus shown in Fig. 13 collapsible tubes open at both ends are manufactured from such a tube of plastic material. The arrangement is very similar to the arrangement of Figs. 10, 11 and 12 except that, similarly as in the apparatus shown in Figs. 8 and 9, a solid mandrel 120 is provided, the lower surfaces of the jaws 121 lie in the same plane as the lower tip of the mandrel 120 during the squeezing process, thereby preventing the tube to be closed at its lower end, that the cutter 122 merely serves as a trimming knife for the purpose described above with reference to Figs. 8 and 9, and that additional cutting wheels 123 are provided which are similar to and similarly arranged and operated, as those shown in Fig. 8 and which serve the same purpose. It is believed that the arrangement shown in Fig. 13 otherwise needs no further explanation.

Figure 15:
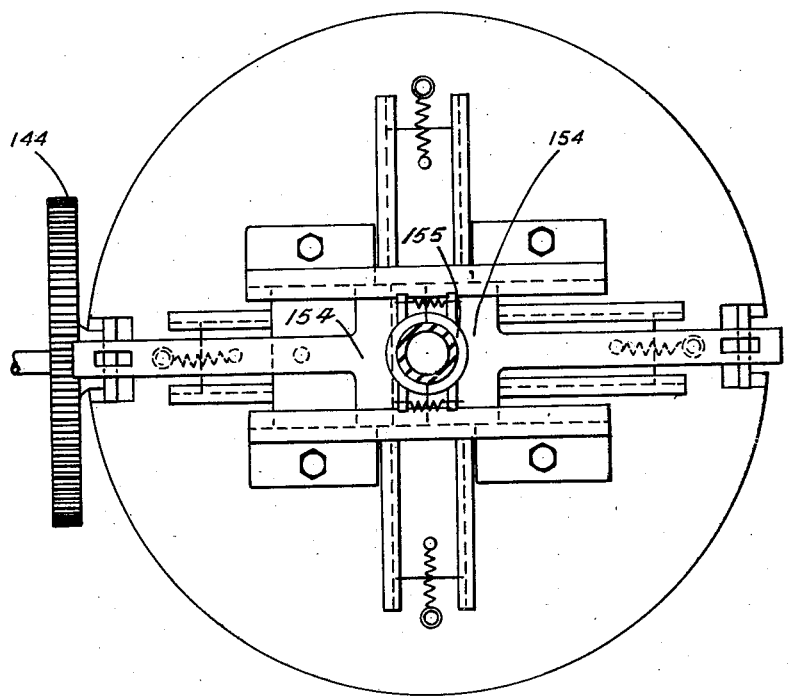
Fig. 15 is a section along the line XV—XV of Fig. 14.
Figure 16:
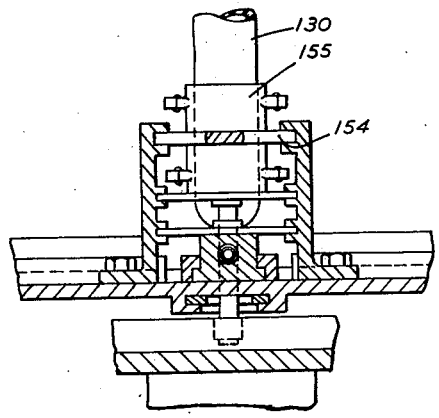
Fig. 16 illustrates a detail of the apparatus shown in Figs. 14 and 15 on an enlarged scale.

According to a further modification of the invention, the containers may be manufactured from a prefabricated tubing of plastic material. Such a modification is illustrated in Figs. 14, 15 and 16. With this modification, a prefabricated tubing 130 is intermittently drawn from a storing device 131 by means of guide rollers 132. A reciprocating mandrel 133 actuated by an eccentric 134 rigidly mounted on a shaft 135 driven in any convenient manner is arranged in a hollow stand 136 and adapted to enter the free end of the tubing 130. The stand 136 is provided with a baffle 137, an opening 140, and an external inclined chute 141. The stand 136 carries a turn-table 142 driven, over a bevel gear 143, and gear wheels 144 and 145, by the shaft 135. The turn-table is provided with three cam surfaces similar to those hereinbefore described against which bear rollers 146, 147, 148 respectively under the action of respective springs. The rollers 147 and the associated cam surface operate movable jaws 151 for forming the neck portion as previously described, the roller 148 and the associated cam surface operate cutters 152 and 153 each similar to, and similarly operated as, the cutters previously described, and the rollers 146 and the associated cam surface operate a gripping device generally denoted by reference numeral 154 adapted to close around and hold the tubing 130 while the tubing is stationary. The gripping device 154 consists of two parts and is clearly illustrated in Figs. 15 and 16. When the gripping device is closed around the tubing 130, it forms a sleeve 155 (see Fig. 16) around the tubing 130.

In the position shown in Fig. 14 the four jaws 151 and the four parts of the gripping device 154 have closed around the tubing 130 while it is stationary. The heated jaws 151 have formed a neck portion in the tubing 130 around the tapered end of the mandrel 133, and, on the neck portion, retaining means for a cap or the like closure member in the manner previously described. On rotation of the turn-table 142 the cutter 152 severs, from the tubing 130, a finished tube 160 having a neck portion and being open at both ends. Simultaneously, the cutter 153 severs a short portion 161, which has been deformed by the jaws, from the tubing 130. Owing to the rotation of the eccentric 134, the mandrel 133 moves downwards while the tube 160 is still held at its neck portion by the jaws whereby the mandrel 133 is withdrawn from the tube 160. On further rotation of the turn-table 142, the cutters 152 and 153, and the jaws 151 are retracted, and the gripping device 154 is opened, whereupon a further length of the tubing 130 is drawn from the storing device 131 by the guide rollers 132. The tube 160 and the portion 161 fall downwards under gravity and under the pushing action of the free end of the tubing 130 while drawn from the storing device 131, are deflected by the baffle 137 and caused to leave the hollow stand 134 through its opening 140. They glide down the chute 141 into a collecting device (not shown). On further rotation of the eccentric 134, the mandrel 133 is raised and enters the tubing 130 through its free end. When the mandrel 133 has reached substantially its highest position, the rotating turn-table 142 causes the jaws 151 to close around tapered end of the mandrel 133 and to squeeze the tubing 130 together and to emboss it with retaining means for a cap or the like in the manner previously described. The position of the arrangement shown in Fig. 14 has now been reached again, and the apparatus is ready for the next cycle of operation.

I wish to emphasize that in all the embodiments shown, the squeezing jaws are provided, on their faces engaging the neck portion, with means for providing retaining means thereon such as those indicated by numerals 4, 12 and 22 in Figs. 1, 2 and 3. If, for example, the retaining means consist of screw threads 4 embossed on a neck portion 2, complementary grooves should be provided on the faces of the jaws. A face of one jaw showing such grooves is illustrated separately and by way of example only in Fig. 17.

It should be clearly understood, that the embodiments described are given by way of example only, and that many modifications, additions and omissions are possible without departing from the spirit of my invention.

I claim:

1. In the manufacture of a container made of plastic material and having a neck portion the steps of passing a tube of plastic material around a mandrel having a tapered end portion, heating and thereby softening that part of the tube which surrounds the tapered end portion, squeezing the softened part against the tapered end portion to form the neck portion, and disengaging the neck portion from the tapered end portion of the mandrel.

2. In the manufacture of a container made of plastic material and having a neck portion the steps of passing a tube of plastic material around a mandrel having a tapered end portion, heating and thereby softening that part of the tube which surrounds the tapered end portion, squeezing the softened part against the tapered end portion to form the neck portion, cutting the tube at a region beyond the end of the mandrel, and disengaging the neck portion from the tapered end portion of the mandrel.

3. In the manufacture of a container made of plastic material and having a neck portion the steps of passing a tube of plastic material around a mandrel having a tapered end portion, heating and thereby softening that part of the tube which surrounds the tapered end portion, squeezing the softened part against the tapered end portion to form the neck portion, forming a means for retaining a closure member on the neck portion, and disengaging the neck portion from the tapered end portion of the mandrel.

4. In the manufacture of and filling a container made of plastic material and having a neck portion the steps of passing a tube of plastic material around a hollow mandrel having a tapered end portion, heating one end of the tube to soften it, squeezing the one end together to close it, filling material into the closed portion of the tube through the hollow mandrel, heating and thereby softening that part of the tube which surrounds the tapered end portion, squeezing the softened part against the tapered end portion to form the neck portion, forming a means for retaining a closure member on the neck portion, and disengaging the neck portion from the tapered end portion of the mandrel.

5. In the manufacture of a container made of plastic material the steps of extruding a tube of plastic material around a mandrel having a tapered end portion, heating and thereby softening that part of the tube which surrounds the tapered end portion, squeezing the softened part against the tapered end portion to form the neck portion, forming a means for retaining a closure member on the neck portion, and disengaging the neck portion from the tapered end portion of the mandrel.

6. A method as defined in claim 5, wherein the tube is continuously extruded.

7. An apparatus for manufacturing containers made of plastic material and having a neck portion, comprising a mandrel, a tapered end portion on said mandrel, means for passing a tube of plastic material around said mandrel, means arranged at the level of said tapered end portion for heating, softening and squeezing together a part of the tube around said tapered end portion, embossing means on said squeezing means, and means for disengaging the said part of the tube from said tapered end portion.

8. An apparatus for manufacturing containers comprising a mandrel, a tapered end portion on said mandrel, means for extruding a tube of plastic material around said mandrel, a turn-table, means for rotating said turn-table, at least two cam surfaces on said turn-table, a cutter for cutting the extruded tube, means co-operating with at least one of said cam surfaces for operating said cutter, a plurality of squeezing means arranged at the level of said tapered end portion for squeezing the tube around said tapered end portion, means for heating said squeezing means, and means co-operating with at least one of said cam surfaces for operating said squeezing means in timed relationship to said cutter.

9. An apparatus as defined in claim 7, wherein the mandrel is hollow.

10. An apparatus for manufacturing containers comprising a mandrel, a tapered end portion on said mandrel, means for continuously extruding a tube of plastic material around said mandrel, a turn-table, means for rotating said turn-table, at least two cam surfaces on said turn-table, a cutter for cutting the extruded tube, means co-operating with at least one of said cam surfaces for operating said cutter, a plurality of squeezing means arranged at the level of said tapered end portion for squeezing the tube around said tapered end portion, means for heating said squeezing means, means co-operating with at least one of said cam surfaces for operating said squeezing means in timed relationship to said cutter, and means for displacing said turn-table, said cutter, said squeezing means and said mandrel alternately in the direction in which the tube is extruded and in the opposite direction in timed relationship to the operation of said cutter and said squeezing means.

11. An apparatus for manufacturing containers comprising a mandrel, a tapered end portion on said mandrel, means for continuously extruding a tube of plastic material around said mandrel, a turn-table, means for rotating said turn-table, at least two cam surfaces on said turn-table, a plurality of cutters for cutting the extruded tube at least at two different regions, means co-operating with at least one of said cam surfaces for operating said cutters, a plurality of squeezing means arranged at the level of said tapered end portion for squeezing the tube around said tapered end portion, means for heating said squeezing means, means co-operating with at least one of said cam surfaces for operating said squeezing means in timed relationship to said cutter, and means for displacing said turn-table, said cutters, said squeezing means and said mandrel alternately in the direction in which the tube is extruded and in the opposite direction in timed relationship to the operation of said cutters and said squeezing means.

12. An apparatus as defined in claim 7, wherein embossing means are provided on said squeezing means for embossing a means for retaining a closure member on the tube.

13. In the manufacture of a container made of plastic material and having a nozzle through which the container when filled may be emptied the steps of passing a tube of plastic material around a mandrel, heating and thereby softening a part of the tube, squeezing the softened part against the mandrel to form the nozzle, impressing on the outer surface of the nozzle means for retaining a closure member thereon, and disengaging the neck portion from the tapered end portion of the mandrel.

14. In the manufacture of a container made of plastic material the steps of intermittently extruding a tube of plastic material around a mandrel having a tapered end portion, heating and thereby softening that part of the tube which surrounds the tapered end portion, squeezing the softened part against the tapered end portion to form the neck portion, forming a means for retaining a closure member on the neck portion, and disengaging the neck portion from the tapered end portion of the mandrel.

KURT POSNER.

REFERENCES CITED

The following references are of record in the file of this patent:

UNITED STATES PATENTS

| Number | Name | Date |
|---|---|---|
| 700,805 | Paine | May 27, 1902 |
| 1,318,292 | Laskey | Oct. 7, 1919 |
| 1,628,333 | Schaub | May 10, 1927 |
| 1,986,422 | Zwoyer | Jan. 1, 1935 |
| 2,113,636 | Vogt | Apr. 12, 1938 |
| 2,113,658 | Lakso | Apr. 12, 1938 |
| 2,317,687 | Larchar | Apr. 27, 1943 |